Nov. 29, 1949 R. J. MINSHALL 2,489,799
INFLATABLE ICE REMOVING APPARATUS FOR AIRCRAFT
Filed April 15, 1943 2 Sheets-Sheet 1
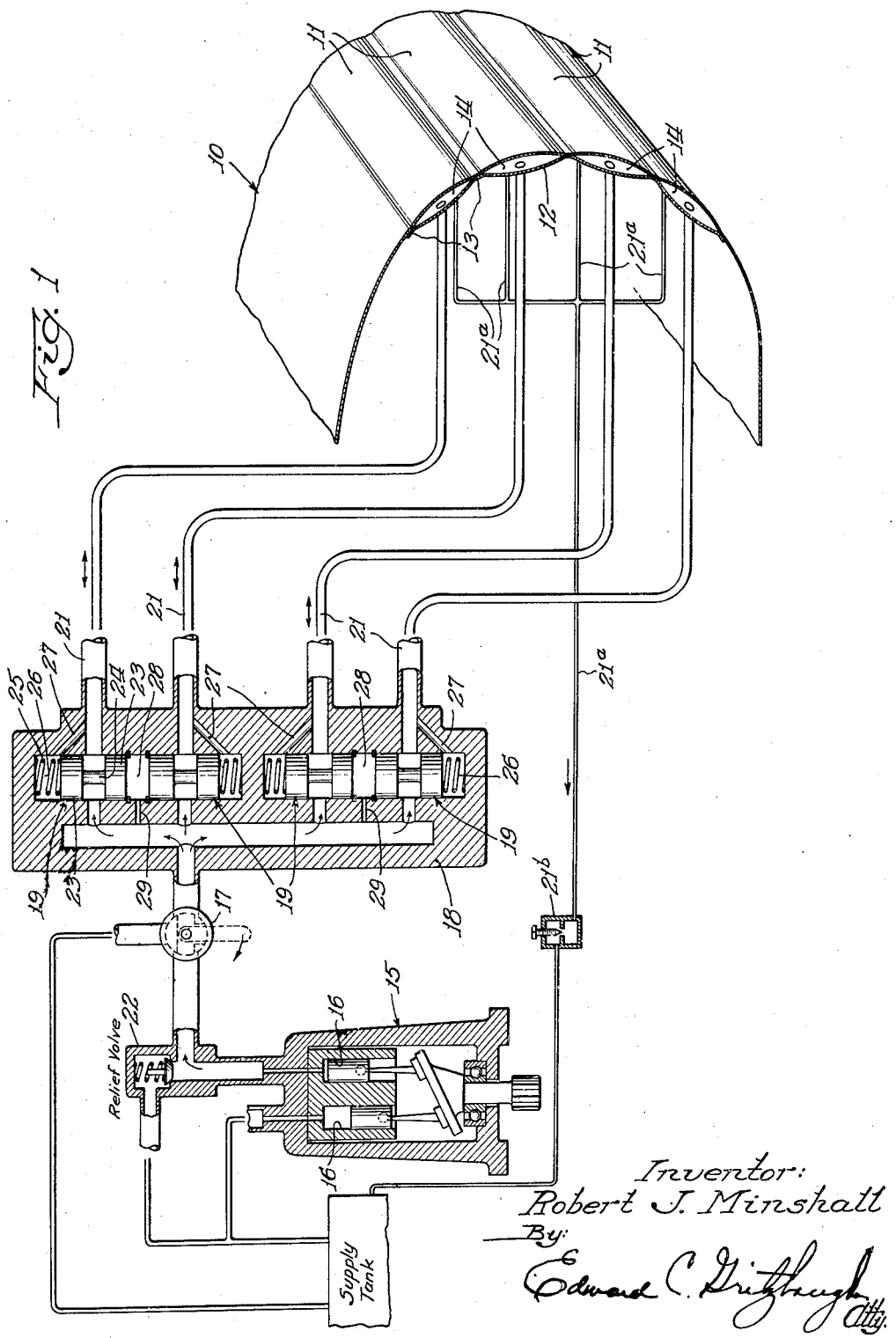

Nov. 29, 1949     R. J. MINSHALL     2,489,799
INFLATABLE ICE REMOVING APPARATUS FOR AIRCRAFT
Filed April 15, 1943     2 Sheets-Sheet 2
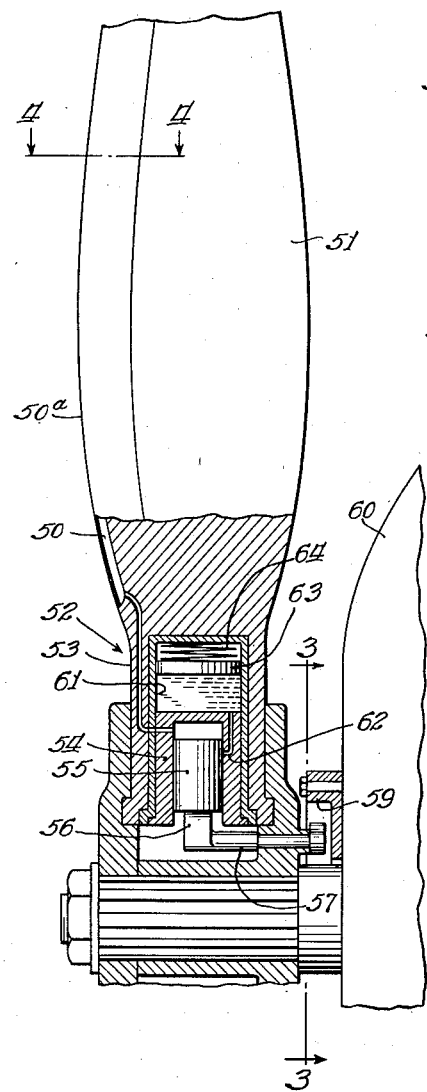
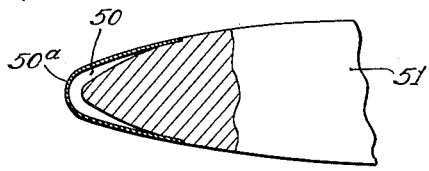
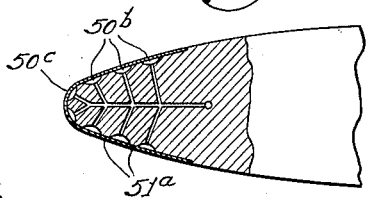
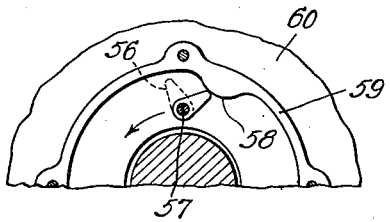
Inventor:
Robert J. Minshall
By: Edward C. Fitzbaugh
Atty Patented Nov. 29, 1949

2,489,799

UNITED STATES PATENT OFFICE 2,489,799

INFLATABLE ICE REMOVING APPARATUS FOR AIRCRAFT

Robert J. Minshall, Shaker Heights, Ohio, assignor, by mesne assignments, to Borg-Warner Corporation, Chicago, Ill., a corporation of Illinois Application April 15, 1943, Serial No. 483,084

10 Claims. (Cl. 244—134)

This invention relates to aircraft and more particularly to an arrangement for preventing the accumulation of ice thereon as well as effecting the removal of ice formations therefrom.

It has been proposed heretofore to provide means for expanding and contracting flexible shoes positioned on the leading surfaces of aircraft, as, for example, the provision of expandable rubber shoes periodically inflated by means of air pressure.

It is an object of this invention to provide an improved arrangement of means for removing ice formations by controlling changes in the contour of leading surfaces, subject to ice collection hazards, in an effective manner not heretofore appreciated.

A further object is to provide an improved arrangement of means for removing ice formations from the propellers by controlling changes in the contour of the leading surfaces thereof subject to ice collection hazards, in an effective manner not heretofore appreciated.

It is an object of this invention to so arrange a leading surface of the aircraft skin or covering as to render it unnecessary to provide the auxiliary external rubber shoes normally employed for the purpose of effecting ice removal.

Another object is the provision of an improved arrangement for delivering the actuating energy to the de-icing surface in such a manner that only a limited expansion and contraction of the surface is required, reliance being had upon a novel action to effect the necessary de-icing, as distinguished from formerly known arrangements wherein attempts have been made to accomplish de-icing by extensive expansion and contraction of a leading rubber shoe by inflation and deflation thereof with air at a relatively low frequency.

It is a further object of this invention to provide in a de-icing system made up of a plurality of expansible leading surfaces, a novel arrangement such that in the event a particular zone or section thereof is ruptured, as by gun fire, the same is automatically isolated from the remainder of the system without interfering with the continued operation of the unaffected de-icing surfaces.

The above and other objects, advantages and uses of my invention will become more apparent from a reading of the following specification and claims taken in connection with the appended drawings, which form a part of this specification wherein:

Fig. 1 is a schematic view partially in section showing one preferred embodiment of my invention as applied to de-icing a leading wing surface;

Fig. 2 is a schematic view partially in section showing another embodiment of my invention as applied to de-icing the leading surfaces of a propeller;

Fig. 3 is a broken-away section view taken substantially on the line 3—3 of Fig. 2 and indicating to advantage the stationary cam;

Fig. 4 is a broken-away section view taken substantially on the line 4—4 of Fig. 2; and Fig. 5 is a broken-away section view corresponding to Fig. 4 but showing an alternative construction.

One of the essential aspects of the present invention resides in employing the usual skin or covering of the advance or leading portion of the plane as part of the flexible chamber as differentiated from adding the usual extra heavy rubber shoe. This would not be possible if it were necessary to expand and contract the surface of the de-icing surface to the extent that the usual rubber shoes are required to be expanded and contracted. Particularly is this true in the case of a plane having a metal covering or skin. In the present arrangement this requirement for limiting the extent of expansion and contraction is overcome by employing as the surface-actuating force a supply of non-compressible liquid such as oil, delivering the same to the back surface of the covering in the critical area and imparting to this liquid a relatively high frequency of pressure variations simulating in effect what is ordinarily known as "water hammer."

Referring to Fig. 1 of the drawing, there is shown by way of example, a section 10 of a wing covering or skin having the forward or leading portion thereof formed with relatively small undulations or rises 11 to provide for limited expansion and contraction. Positioned on the rear side of the wing surface is a second sheet 12, the two being fastened together by suitable means and sealed together along opposed portions 13 intermediate adjacent undulations. This covering or skin is usually made of a lightweight metal and where permissible these parts will be welded together or otherwise fastened by conventional means with the requisite sealing to define a plurality of separate lobes or expansible chambers 14. Thus aside from the provision of the rear sheet 12, the expansible chambers 14 are defined by the usual aircraft covering or skin 10. It will be apparent that while this arrangement has been described in connection with a wing of an aircraft, the same is equally applicable to other surfaces exposed to ice formation, such for example, as the nacelle, or propeller blade as will appear.

It will be apparent that where the expansible chambers are formed in the manner above-described, it is necessary to limit the extent to which expansion and contraction is required in order to effect the requisite removal of ice formation. Therefore, I have provided for delivering a non-compressible fluid, such as oil, to the respective expansible chambers 14, and I have found that by maintaining a predetermined minimum pressure and raising this pressure to a predetermined maximum value periodically at a relatively high frequency, the necessary extent of expansion and contraction is materially reduced and the efficiency of ice removal, nevertheless, improved.

While a number of devices may be employed for controlling the pressure variations in the several expansible chambers, I have found that the same can be accomplished effectively by means of a multiple plunger pump 15. One of the characteristics of this type of pump is the fact that in the absence of some special arrangement or form of discharge ports the discharge from each plunger chamber 16 is effected with a sudden and impulsive rise in pressure.

In the arrangement shown the pump delivers oil pressure through a conduit and manually controlled valve 17, when the latter is in the "on" position, to a manifold housing 18 in which is mounted a plurality of double check valves 19, associated respectively with separate discharge lines 21 from said housing leading to separate ones of the expansible chambers or lobes 14. Hence with the manually controlled valve in "on" position and the plunger pump operated by a suitable source of power, such as the aircraft engine (not shown), there will be imparted to the expansible chamber a series of rapid impulses transmitted through the non-compressible oil medium, one impulse each time discharge is effected from a plunger chamber 16. In addition, it will be noted that a relief valve 22 is provided and set for a predetermined maximum pressure upon the occurrence of which the liquid is led back to a supply tank from which each plunger draws on the intake stroke thereof. It will also be noted that this arrangement results in a predetermined minimum pressure being maintained in the lobes at all times when the valve 17 is in "on" position. In the present arrangement, for example, it is contemplated that a satisfactory value of minimum pressure may be about fifteen pounds per square inch, the same varying from this value to about twenty pounds per square inch with the discharge of the plungers. With a six-plunger pump rotating at 3600 R. P. M. there would be 180 cycles of pressure change per minute. Since a non-compressible fluid is employed, these pressure impulses will be imparted to the lobes or expansible chambers with a liquid hammer-like action. It is this vibration and liquid hammer-like action in combination with the relatively small amount of actual expansion and contraction of the respective lobes or chambers that effects the breaking up of ice formations in contact with leading surfaces.

For the purpose of effecting a very small circulation of fluid, with the attendant advantages of air removal, etc., line 21a leads from chambers 14 through needle valve 21b back to the supply tank. The flow through this line is very small and does not affect the delivery of pulsating pressure to the flexible chambers.

At such time as it is not desired to effect de-icing, the manual control valve 17 may be moved to "off" position to remove the load from the pump with the result that the same merely circulates liquid to and from the supply tank. The double check or shuttle valves 19 each comprises a pair of opposed pistons 23 with a reduced connecting link 24, these pistons being operable in cylinders formed within the manifold housing and normally biased by coil compression springs 25 to a position wherein the respective outlet liquid streams pass centrally between the pairs of pistons 23.

The chambers 26 in the rear of corresponding ones of the pistons of each pair of connected pistons are placed in communication with the respective discharge lines leading to the expansible chambers through conduits 27. Chambers 28 between corresponding opposite pistons 23 are placed in communication with the inlet pressure to manifold 18 through passages 29. The outlet pressure is placed in communication with chambers 25 containing springs 26 with the result that the values are normally held in the proper position to permit flow therepast. In the event that one of the expansible chambers or its associated line becomes ruptured as by gun fire, then pressure is lost from behind the piston in the chamber containing spring 26 and the pressure in chamber 28 then becomes effective to move the double check valve to the closed position thus to shut off flow to the particular line that is affected without interfering with the normal operation of the other lines and associated expansible chambers.

While I have shown a multiple plunger pump and prefer the same because of its particularly advantageous operating characteristics, I contemplate the use of other means such as a gear pump, or a fluttering valve for effecting the necessary pressure impulses.

Turning to Figs. 2 to 4, I have shown an alternative embodiment of my invention as applied to the problem of de-icing propellers. As in the case of the above-described modification, the arrangement includes essentially the provision of a flexible chamber 50 as part of the leading section of the propeller blade 51, the required extent of expansibility being relatively small compared to that of the heretofore proposed rubber shoes. An expansion of the order of from about 0.0625'' to about 0.1250'' is found to be sufficient as compared to the normal expansion of rubber shoes of as much as 0.50''.

The outer surface 50a of the flexible propeller de-icing chamber 50 is arranged to be actuated, as in the above modification by means of a non-compressible liquid, such as oil or glycerine, the delivery pressure of which is varied between selected limits and at a relatively high frequency. This pressure may, for example, be varied between fifteen and twenty pounds per square inch, as described in the case of Fig. 1.

The arrangement illustrated for supplying the actuating pressure to the expansible propeller chambers 50 comprises a pump and reservoir assembly 52 located in the hub portion 53 of the propeller 51. A cylinder 54 has a piston 55 therein arranged to be actuated by an eccentric cam 56 carried on a shaft 57 protruding from the hub 53 and in turn operable as the propeller is rotated, by a cam rise 58 on a stationary cam 59 carried on the nose 60 of the plane (not shown). Any selected number of rises 58 may be included on the cam 59; however, one is deemed sufficient for most installations. Thus when cruising at eight hundred propeller R. P. M., for example, and using one cam rise 58, the expansible or flexible chamber 50 will receive eight hundred impulses per minute. The cylinder may be positioned in a reservoir chamber 61 and provided with a refill compensating port 62 uncovered by the piston when in retracted or low pressure position. For maintaining a predetermined minimum pressure in the reservoir, an auxiliary piston 63 may be employed urged in the pressure maintaining direction by a compression coil spring 64.

The flexible propeller chamber 50 may be provided in a number of ways, which may include recessing the blade and fastening cover 50a over the recess to provide the normal contour of the blade, as well as to provide the underlying chamber 50 for reception of the pressure fluid in contact with the back of the cover 50a as shown in section in Fig. 4. This cover may be fastened as by welding or riveting to form in effect a continuous part of the propeller.

In Fig. 5 an alternative form is shown wherein the propeller is provided with a plurality of flexible de-icing chambers or lobes 50b which arrangement gives a stronger construction, as the covering sheet 50c is given a plurality of points of support 51a to which the sheet may be suitably fastened as by welding.

Since the wall of the flexible chamber is required to expand only a very limited amount in order to accomplish de-icing of the propeller, this wall can be made in effect part of the propeller. This wall may thus be in the form of sheet metal with the joining edges thereof forming a substantially continuous surface with the surface of the propeller. This reduction in the required surface expansion is made possible by the novel manner in which the de-icing impulses are imparted to the flexible chamber.

While I have disclosed my invention in connection with certain embodiments thereof, it is to be understood that this is by way of example rather than by way of limitation, and I intend that the same be defined by the appended claims which should be given a scope commensurate with the prior art.

I claim:

1. In combination with a leading portion of the skin or covering of an aircraft part; means back of said leading portion of said skin and defining therewith a chamber the walls of which are capable of only slight flexibility; means including a conduit for delivering a solid column of non-compressible fluid to said chamber for pressure engagement with the back side of said leading portion of said skin, a pressure generator effective to impart hydraulic hammer-like blows to said solid column of non-compressible fluid for transmission to the back side of said leading portion whereby to cause shock in said leading portion as well as accompanying expansion and contraction of said chamber, said expansion and contraction of said leading portion being of a low order insufficient alone to produce appreciable de-icing, said shock resulting from said hydraulic hammer-like blows being the major contributing factor in producing de-icing.

2. In a de-icing arrangement for an aircraft part having a thin skin-like air engaging covering, a leading portion of which covering is subject to the formation thereon of ice; means including a conduit for delivering a solid column of non-compressible fluid medium into pressure contact with the back surface of said leading portion of said skin, a pressure generator effective to impart hydraulic hammer-like blows to said solid column of non-compressible fluid which hammer-like blows are transmitted through the solid column of fluid to said back surface, and pressure relief valve means interposed between said generator and said back surface effective to limit the maximum value of pressure delivered by said generator, said transmission of hydraulic hammer-like blows producing an actual movement or stretch of said leading skin portion of only a very low order insufficient alone to produce appreciable de-icing, said hydraulic hammer-like blows being the major contributing factor in producing de-icing.

3. In a de-icing arrangement for an aircraft part having a skin-like air engaging covering, a leading portion of which covering is subject to the formation of ice thereon; means associated with the back side of said leading portion effective to define therewith a plurality of separate lobes or chambers, a separate conduit leading to each chamber for delivering a solid column of non-compressible fluid medium into pressure contact with said back side of said leading portion of said skin, a source of non-compressible fluid medium, a multiple plunger type fluid pressure generator receiving fluid from said source and delivering the same to said conduits, a pressure relief valve disposed between said generator and said conduits for limiting the maximum value of pressure delivered, said generator including means effective to impart hydraulic hammer-like blows to said solid column of non-compressible fluid which said hammer-like blows are transmitted through said column of fluid to said back side of said leading portion within each of said chambers for imparting shock thereto, said hydraulic hammer-like blows being the major contributing factor in producing de-icing.

4. The combination with an aircraft part having means defining a plurality of lobes or expansible chambers on a leading surface thereof for effecting de-icing and means for delivering separate streams of non-compressible energizing fluid under pressure to said lobes for cyclically varying said pressure at a rapid rate, of means associated with each one of said separate streams effective in response to the loss of pressure in any one of said streams resulting from rupture to shut off the flow therethrough without affecting the delivery of pressure to the remaining lobes.

5. In a de-icing arrangement for an aircraft part comprising means defining a plurality of expansible chambers located on a leading surface of the aircraft part for effecting the breaking up of ice formations, means defining separate conduits for delivering non-compressible fluid to each of said chambers, and means for maintaining a predetermined minimum pressure in said conduits and chambers and varying the same with a relatively high frequency, the combination therewith of a separate shuttle valve assembly located in communication with each one of said separate conduits and means responsive to loss of pressure in any one of said conduits resulting from rupture effective to cause the associated shuttle valve to close and shut off the delivery therethrough without affecting the transmission of pressure through the remaining conduits.

6. In combination, in an aircraft part, means defining a flexible leading surface on said aircraft part having an underlying chamber for the reception of a non-compressible fluid medium, means for directing a solid column of non-compressible fluid medium to said chamber into pressure communication with the back side of said leading surface, pressure generating means effective to transmit hydraulic hammer-like blows to said solid column of non-compressible fluid for imparting a shock to said leading surface and rotatable means for driving said generator, said transmission of hydraulic hammer-like blows being the major contributing factor in producing de-icing.

7. In combination, in an aircraft part, means defining a flexible leading surface on said aircraft part having an underlying chamber for the reception of a non-compressible fluid medium, means for directing a solid column of non-compressible fluid medium to said chamber into pressure communication with the back side of said leading surface, a pump having a reciprocable piston for imparting hydraulic hammer-like pressure blows through said solid column of non-compressible fluid medium to said back side of said leading surface in said chamber, cam means for actuating said piston, and means for operating said cam.

8. In a de-icing arrangement for an aircraft part having a skin-like air engaging covering, a leading portion of which covering is subject to the formation of ice thereon; means back of said leading portion of said skin and defining therewith a chamber the walls of which are capable of only slight flexibility; means including a conduit for delivering a solid column of non-compressible fluid medium to said chamber for pressure engagement with the back side of said leading portion of said skin and a pressure generator effective to transmit hydraulic hammer-like blows through said solid fluid column to said chamber for imparting hydraulic shock to said leading portion of said skin-like covering, said transmission of hydraulic hammer-like blows producing an actual movement or stretch of said leading portion of said skin of only a very low order insufficient alone to produce appreciable de-icing, said hydraulic hammer-like blows resulting in said shock being the major contributing factor in producing de-icing.

9. The combination with an aircraft part having means defining a plurality of lobes or expansible chambers on a leading surface thereof for effecting de-icing, and means for delivering separate streams of non-compressible energizing fluid to said lobes, such energizing fluid having a pressure which is varied at a relatively high frequency; of means associated with each one of said separate streams effective in response to the loss of pressure in any one of said streams resulting from rupture to shut off the flow therethrough without affecting the delivery of pressure to the remaining lobes.

10. The combination with an aircraft part having means defining a plurality of lobes or expansible chambers on a leading surface thereof for effecting de-icing, and means for delivering separate streams of non-compressible energizing fluid under pressure to said lobes for cyclically varying said pressure at a rapid rate, said means also delivering pulsating hammer-like blows transmitted to the lobes through the energizing fluid; of means associated with each one of said separate streams effective in response to the loss of pressure in any one of said streams resulting from rupture to shut off the flow therethrough without affecting the delivery of pressure to the remaining lobes.

ROBERT J. MINSHALL.

REFERENCES CITED

The following references are of record in the file of this patent:

UNITED STATES PATENTS

| Number | Name | Date |
| --- | --- | --- |
| 1,013,180 | Key | Jan. 2, 1912 |
| 2,135,119 | Wood | Nov. 1, 1938 |
| 2,249,940 | Bulloch | July 22, 1941 |
| 2,322,658 | Overbeke | June 22, 1943 |
| 2,327,206 | Morgan | Aug. 17, 1943 |

FOREIGN PATENTS

| Number | Country | Date |
| --- | --- | --- |
| 187,365 | Great Britain | Oct. 22, 1922 |
| 505,433 | Great Britain | May 5, 1939 |
| 518,463 | Great Britain | Feb. 28, 1940 |
| 523,108 | Great Britain | July 5, 1940 |
| 542,878 | Great Britain | Jan. 30, 1942 |